(12) United States Patent
Deng et al.

(10) Patent No.: US 6,580,824 B2
(45) Date of Patent: Jun. 17, 2003

(54) CLASSIFICATION OF PHOTOS WITH SEPIA TONES

(75) Inventors: Yining Deng, Mountain View, CA (US); Daniel Tretter, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 240 days.

(21) Appl. No.: 09/853,652

(22) Filed: May 14, 2001

(65) Prior Publication Data

US 2002/0181767 A1 Dec. 5, 2002

(51) Int. Cl.$^7$ .................................................. G06K 9/00
(52) U.S. Cl. ...................................... 382/165; 382/228
(58) Field of Search ................................ 382/162, 165, 382/167, 159, 228, 305

(56) References Cited

U.S. PATENT DOCUMENTS

| | | | |
|---|---|---|---|
| 5,253,302 A | * 10/1993 | Massen | ........................ 382/165 |
| 5,341,226 A | 8/1994 | Shiau | |
| 5,345,320 A | 9/1994 | Hirota | |
| 6,282,330 B1 | * 8/2001 | Yokota et al. | ............... 382/305 |
| 6,477,269 B1 | * 11/2002 | Brechner | ..................... 382/165 |

FOREIGN PATENT DOCUMENTS

EP          0935216 A2      8/1999

OTHER PUBLICATIONS

S.–F., Chang, W. Chen and H. Sundaram, "Semantic Visual Templates; Linking Visual Features to Semantics," Proc. of IEEE Intl. Conf. on Image Processing, vol. 3, p. 531–35, 1998.

S. Paek and S.–F. Chang, "A Knowledge Engineering Approach for Image Classification Based on Probabilistic Reasoning Systems", Proc. of Intl. Conf. on Multimedia & Expo, 2000.

R. Qian, N. Haering and I. Sezan, "A Computational Approach to Semantic Event Detecation," Proc. of IEEE Conf. Computer Vision and Pattern Recognition," vol. 1, p. 200–06, 1999.

M. Szummer and R.W. Picard, "Indoor–outdoor image classification," Proc. of IEEE Workshopon Content–Based Access of Image and Video Libraries, p. 42–51, 1998.

A. Vailaya, M. Figueiredo, A, Jain and H.–J. Zhang, "A Bayesian framework for semantic classification of outdoor vacation images," Proc. of SPIE: Storage and Retrieval for Image and Video databases VII, vol. 3656, p. 415–26, 1999.

A. Vailaya and A. Jain, "Detecting sky and vegetation in outdoor images," Proc. of SPIE: Storage and Retrieval for Image and Video databases 2000, vol. 3972, p. 411–20, 2000.

N. Vasconcelos and A. Lippman, "A BAyesian framework for semantic content characterization," Proc. of IEEE Conf. on Computer Vision and Pattern Recognition, p. 566–71, 1998.

* cited by examiner

Primary Examiner—Phuoc Tran

(57) ABSTRACT

Methods and systems that classify sepia-toned digital images are described. An exemplary method includes converting RGB values of a digital image to hue saturation intensity (HSV) values. Pixels of the digital image that are not above a predetermined intensity or saturation threshold are removed from the image. The remaining pixels are analyzed and classified as sepia-toned images based on the results of the analysis. Additionally, a method for training a system to recognize sepia-toned images is disclosed.

20 Claims, 3 Drawing Sheets

CLASSIFICATION OF PHOTOS WITH SEPIA TONES

BACKGROUND OF THE INVENTION

1. Field of the Invention

The present invention relates to digital image database and classification systems, and in particular to classification of sepia tone photographs that have been converted to digital formats.

2. Background Information

Automatic image classification has many important applications, particularly in classifying a special class of images: black and white photos with sepia tones. Some of these images have been scanned from antique photos, which were originally in black and white. Over the years they gradually turn to yellow or brown due to the chemical reactions of the film paper. Still, many other sepia-tone images were specially produced either chemically or digitally to generate an antique appearance.

Classification of photos with sepia tones is useful in several applications. Because of the special color tones, many general-purpose color image processing techniques would not work well on these images. For example, a face-detection algorithm in an imaging system that detects faces purely based on the skin color is unlikely to generate the correct results on these photos because the skin color has been changed. By detecting images with sepia tones, the system can handle these images appropriately to avoid possible errors. For instance, an alternative algorithm can be used to detect the face that uses features that are invariant to color changes, such as eye corners. Therefore, the detection accuracy of the image recognition system may be significantly improved.

Sepia-toned images can also cause problems in automatic color balance or enhancement processes. Because the colors are narrowly concentrated in the sepia tones, the images could be mistakenly considered as color imbalanced. Color corrections to these images could cause undesirable color artifacts. If a color imaging process knows beforehand what kind of image is being processed, it can react appropriately and achieve better results.

Another application of sepia-tone image classification is in image indexing. Large image databases or collections require good indexing mechanisms so that images can be categorized effectively, browsed efficiently, and retrieved quickly. Conventional systems store and retrieve specific information from the database using, for example, descriptive information regarding the image file, such as file creation date, file name, file extension and the like. This form of image classification is not significantly different from the classification of any other digital information.

By relying on the file information, only cursory information can be obtained about the file and nothing at all specifically related to the image. For example, an image file could have a name that had no relation to the type or content of the image, such as a black and white image could have the file name "color_image". Other systems provide classification based on the content of the images, such as flowers, dogs, and the like. In practice, this is usually done by keyword annotation, which is a laborious task.

Image classification techniques have been proposed in the past years that are designed for use in image databases. However, none of these prior techniques have addressed identifying sepia-toned images. Examples of these prior techniques include the following articles. S.F. Chang, W. Chen and H. Sundaram, "Semantic visual templates: linking visual features to semantics," *Proc. of IEEE Intl. Conf. on Image Processing*, vol. 3, p. 531–35, 1998. S. Paek and S. -F. Chang, "A knowledge engineering approach for image classification based on probabilistic reasoning systems," *Proc. of Intl. Conf. On Multimedia & Expo*, 2000. R. Qian, N. Haering and I. Sezan, "A computational approach to semantic event detection," *Proc. of IEEE Conf. Computer Vision and Pattern Recognition*, vol. 1, p.200–06, 1999. M. Szummer and R. W. Picard, "Indoor-outdoor image classification," *Proc. of IEEE Workshop on Content-Based Access of Image and Video Libraries*, p.42–51, 1998. A. Vailaya, M. Figueiredo, A. Jain and H.-J. Zhang, "A Bayesian framework for semantic classification of outdoor vacation images," *Proc. of SPIE: Storage and Retrieval for Image and Video databases VII*, vol. 3656, p. 415–26, 1999. A. Vailaya and A. Jain, "Detecting sky and vegetation in outdoor images," *Proc. of SPIE: Storage and Retrieval for Image and Video databases 2000*, vol. 3972, p. 411–20, 2000. N. Vasconcelos and A. Lippman, "A Bayesian framework for semantic content characterization," *Proc. of IEEE Conf. on Computer Vision and Pattern Recognition*, p. 566–71, 1999.

Image databases frequently contain images having different characteristics, such as color images of different color resolutions (e.g., 16, 256, 16 bit, and 24 bit color), gray scale images, black and white images, sepia-toned images, and the like. Prior image classification techniques do not address automatic sepia-toned image classification. Since sepia-toned images can cause difficulties when used with conventional image processing techniques and many sepia tone images are valuable antique photos, it would be desirable to have an image classification system that can analyze the properties of the images themselves and classify the images according to whether or not the image is a sepia-toned image.

SUMMARY OF THE INVENTION

The present invention is directed to methods and systems that classify digital images containing sepia-tones. An exemplary method comprises converting values of a first color space of a digital image to hue saturation intensity (HSV) values; removing any pixel of the digital image below at least one of a saturation threshold and an intensity threshold; analyzing, after the step of removing, remaining pixels of the digital image; and classifying the digital image as a sepia-toned image based on the analysis of the remaining pixels of the digital image.

Alternate embodiments provide for estimating the probability that each of the remaining pixels is sepia-toned based on a predetermined color distribution of sepia-toned images and determining a probability that the digital image is a sepia-toned image.

An exemplary method of training a system to detect sepia-toned images comprises converting values of a first color space of a plurality of training images to HSV values, wherein the training images are sepia-toned images; removing any pixel of the training images below at least one of a saturation threshold and an intensity threshold for each of the plurality of training images; and estimating, after the step of removing, the color distribution of HSV values for remaining pixels over the plurality of training images.

BRIEF DESCRIPTION OF THE DRAWINGS

The above features and advantages of the invention, and additional features and advantages of the invention, will be better appreciated from the following detailed description of the invention made with reference to the drawings, wherein.

DETAILED DESCRIPTION OF THE PREFERRED EMBODIMENTS

Figure 1:
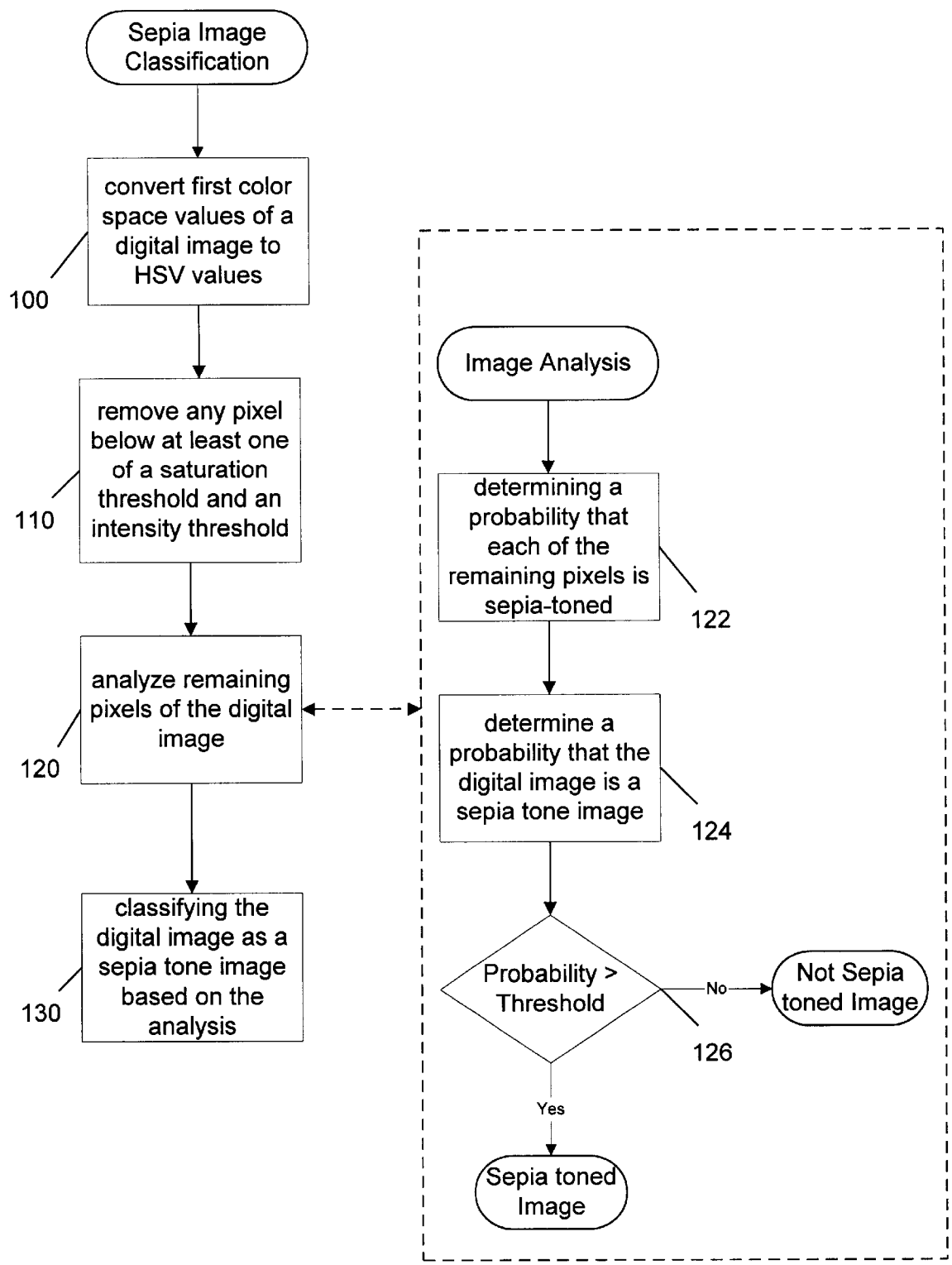
FIG. 1 shows a flow chart of an exemplary method of the present invention.

FIG. 1 shows a flow chart of an exemplary method of classifying sepia-toned images. In step 100, values of a first color space of a digital image are converted to hue saturation intensity values (HSV). One skilled in the art will appreciate that the digital image can be retrieved from a plurality of digital images stored in an image database containing at least one of a group consisting of color images, gray scale images and sepia tone images. Additionally, the first color space can be any know representation of the color space. However, for purposes of explanation and not limitation the remaining description will refer to the first color space as Red, Green, Blue (RGB) color space. Therefore the conversion described is RGB to HSV.

In an exemplary method, the RGB values are normalized (i.e., ranging from 0–1.0). The conversion formula can then be given as:

$$Max = max(R, G, B)$$

$$Min = min(R, G, B)$$

$$Val = Max$$

If $(Val = 0)$ $Sat = 0$, else $Sat = 1 - Min/Val$

If $(Sat = 0)$ Hue is undefined, else $$Hue = \begin{cases} (G-B)/(Max-Min) \times 60 & \text{if } (R = Max \wedge (G-B) \geq 0) \\ (G-B)/(Max-Min) \times 60 + 360 & \text{if } (R = Max \wedge (G-B) < 0) \\ (2.0 + (B-R)/(Max-Min)) \times 60 & \text{if } (G = Max) \\ (4.0 + (R-G)/(Max-Min)) \times 60 & \text{if } (B = Max) \end{cases}$$

where the range of H is 0–360 degrees, S is 0–1.0, and V is 0–1.0. However, those skilled in the art will appreciate that other conversion formulas could be used. Additionally, it will be appreciated that black and white images can be directly identified at the RGB to HSV color space conversion step and can be removed from further consideration.

In step 110, any pixel of the digital image below at least one of a saturation threshold and an intensity threshold is removed. Pixels having low saturation or low intensity are removed from consideration because they tend to appear as gray regardless of their hue values. The pixels are removed based on the following criteria:

$$(1-S)^3 + (1-V)^3 \geq c^3$$

where c is a threshold set 0.94, S is the saturation value ranging from 0 to 1.0 and V is the intensity value ranging from 0 to 1.0.

In step 120, after the step of removing, the remaining pixels of the digital image are analyzed. The digital image is classified as a sepia-toned image based on the analysis of the remaining pixels of the digital image, in step 130. The classification includes at least one of retrieving, displaying, tagging, storing, and the like, that can be performed on the image. For example, the process could tag the sepia-toned images in an image database so another program could preform special image processing procedures on the tagged sepia-toned images or retrieve images from the image database based on the sepia-tone tag.

Optionally, in step 122, the analysis is performed by determining a probability that each of the remaining pixels is sepia-toned based on a predetermined color distribution of sepia-toned images. The predetermined color distribution can be determined in a training stage that is discussed later. Then, in step 124, a probability that the digital image is a sepia-toned image is determined. In step 126, the probability that the digital image is a sepia-toned image is compared to a predetermined threshold for identifying sepia-toned images. For example, if the probability that the digital image is a sepia-toned image is greater than the predetermined threshold the image is determined to be sepia-toned. Those skilled in the art will appreciate that the predetermined threshold for identifying sepia-toned images can also be determined during a training stage.

Figure 2:
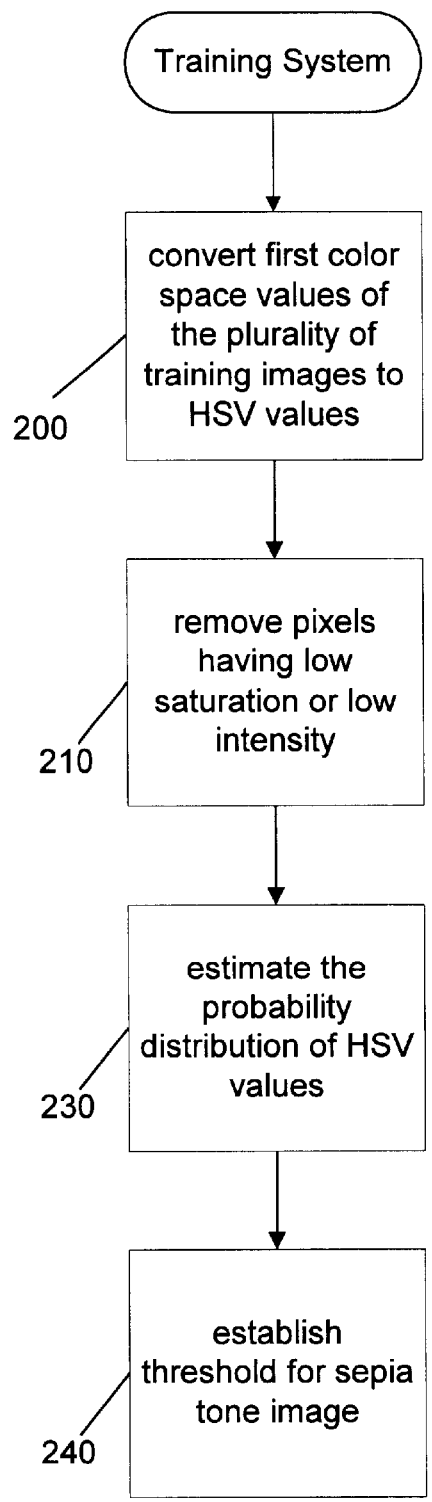
FIG. 2 shows a flow chart of a training method of the present invention.

Referring to FIG. 2, a flow chart of a method of training a system to detect sepia-toned images is shown. In step 200, the RGB values of a plurality of training images are converted to HSV values. The training images are preferably sepia-toned images. Those skilled in the art will appreciate that images that are not sepia-toned images could be used in the set of training images. However, the training images would then have to be identified as sepia-toned or not. In step 210, any pixel of the training images below at least one of a saturation threshold and an intensity threshold is removed for each of the plurality of training images. The color distribution of HSV values for the remaining pixels is then estimated over the plurality of training images, in step 230. Optionally, in step 240, a threshold is established at which an image is classified as a sepia-toned image. Those skilled in the art will appreciate that the RGB to HSV conversion, the saturation threshold and the intensity threshold for the training process can be determined as described above for the classification process. Therefore, the description and equations will not be repeated.

To facilitate an understanding of the invention, many aspects of the invention are described in terms of sequences of actions to be performed by elements of a computer-based system. It will be recognized that in each of the embodiments, the various actions can be performed by specialized circuits (e.g., discrete logic gates interconnected to perform a specialized function), by program instructions being executed by one or more processors, or by a combination of both. Moreover, the invention can additionally be considered to be embodied entirely within any form of a computer readable storage medium having stored therein an appropriate set of computer instructions that would cause a processor to carry out the techniques described herein. Thus, the various aspects of the invention can be embodied in many different forms, and all such forms are contemplated to be within the scope of the invention. For each of the various aspects of the invention, any such form of an embodiment is referred to herein as "logic that" performs a described action.

Figure 3:
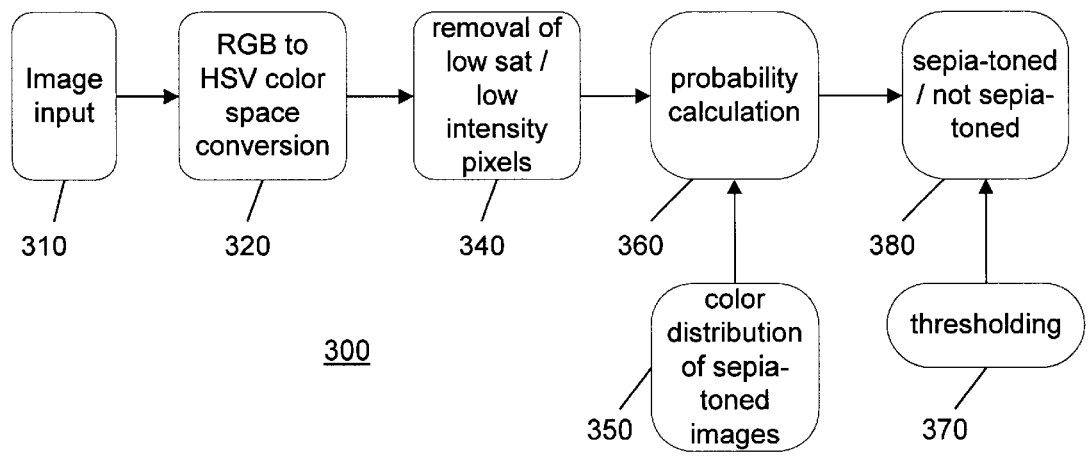
FIG. 3 shows a block diagram of an exemplary system of the present invention.

FIG. 3 is a block diagram of a computer-based system 300 using the threshold obtained from the training process described above. For example, as previously described, each new input image 310 goes through the RGB to HSV color space conversion using logic that converts values of a first color space of a digital image to hue saturation intensity (HSV) values, in block 320. The image's low saturation or intensity pixels are then removed using logic that removes any pixel of the digital image below at least one of a saturation threshold and an intensity threshold, in block 340. The remaining pixels are used to estimate the probability of this image being sepia-toned using a maximum likelihood estimation. Each pixel is assumed to be an independent sample of the input data. The probability of pixel i being sepia-toned can be estimated directly from the predetermined color distribution provided by block 350 (e.g., as determined from the training process from FIG. 2). Then, a joint log probability log (P) can be calculated for the entire image, using logic that analyzes the remaining pixels of the digital image, in block 360, by:

$$\log(P) = \frac{\sum_i \log(p_i)}{N}$$

where N is the total number of remaining pixels, $p_i$ is the probability of pixel i being sepia-toned, and log(P) indicates the probability of the image being sepia-toned. The calculated probability values of sepia-toned photos are, in general, much higher than normal color photos. Therefore, a simple threshold supplied by block 370 can be used to separate color images from sepia-toned images. For example, the threshold is set to −5.2. Thus, if log(P) is greater than −5.2, the image is determined to be sepia-toned, using logic that classifies the digital image as a sepia-toned image based on the analysis of the remaining pixels of the digital image, in block 380.

Figure 4:
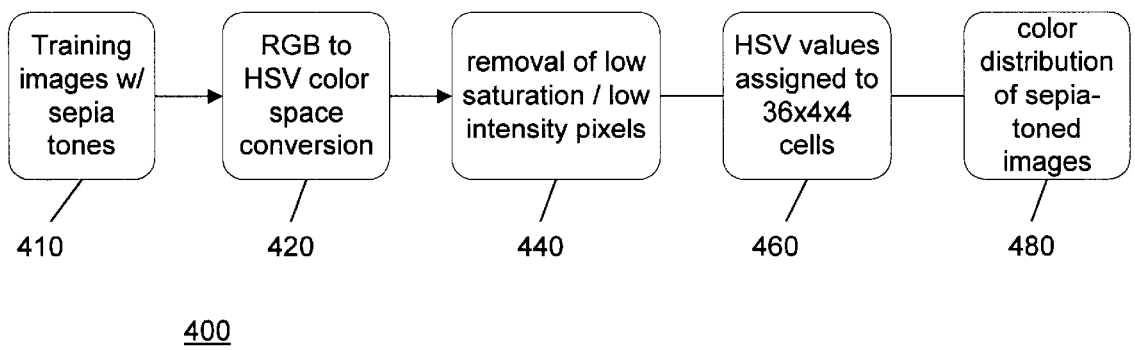
FIG. 4 shows a block diagram of an exemplary training system of the present invention.

FIG. 4 is a block diagram of a computer-based training system 400 according to another embodiment of the present invention. For example, as previously described, each training image 410 goes through the RGB to HSV color space conversion in block 420. The low saturation or intensity pixels are then removed in block 440. In block 460, the HSV space is divided uniformly into cells along H, S, and V dimensions. For example, the H dimension can be divided into thirty-six cells, the S dimension into four cells, and the V dimension into four cells. Each of the remaining pixels of the training images is then assigned to one of the cells based on its HSV values. Values for each cell are established by counting the remaining pixels in each cell. The values for each cell are then normalized by dividing the value for each cell by the total number of the remaining pixels. The result is a thirty-six by four by four-dimensional vector that characterizes the color distribution of the training images, in block 480. This color distribution can also be seen as a rough estimation of the probability density function for remaining pixels in the training images. Typically, the colors in sepia-toned images are mostly centered around yellow and red. Therefore, the cells that correspond to these colors will contain the majority of the remaining pixels.

The foregoing has described principles, preferred embodiments and modes of operation of the invention. However, the invention is not limited to the particular embodiments discussed above. For example, each sepia-toned image could further be classified based on its probability. Images that were very close to the threshold value could then be tagged for manual review. Additionally, if the majority of sepia-toned images were near the threshold, this could serve as an indication that a new set of training images is needed to retrain the system.

Therefore, the above-described embodiments should be regarded as illustrative rather than restrictive, and it should be appreciated that variations may be made in those embodiments by those skilled in the art, without departing from the scope of the invention as defined by the following claims.

What is claimed is:

1. A method of classifying digital images comprising:

converting values of a first color space of a digital image to hue saturation intensity (HSV) values;

removing any pixel of the digital image below at least one of a saturation threshold and an intensity threshold;

analyzing, after the step of removing, remaining pixels of the digital image; and classifying the digital image as a sepia-toned image based on the analysis of the remaining pixels of the digital image.

2. The method of claim 1, wherein analyzing comprises:

determining a probability that each of the remaining pixels is sepia-toned based on a predetermined color distribution of sepia-toned images; and determining a probability that the digital image is a sepia-toned image.

3. The method of claim 2, wherein the probability that the digital image is a sepia-toned image is determined by the following:

$$\log(P) = \frac{\sum_i \log(p_i)}{N}$$

wherein n is a total number of the remaining pixels, $p_i$ is the probability of each remaining pixel i being sepia-toned, and log(P) indicates the probability of the image being sepia-toned.

4. The method of claim 3, further comprising:

comparing the probability that the digital image is a sepia-toned image to a predetermined threshold for identifying sepia-toned images.

5. The method of claim 4, wherein the predetermined threshold for identifying sepia-toned images is −5.2, and wherein the digital image is classified as a sepia-toned image if log(P) greater than −5.2.

6. The method of claim 1, wherein the digital image is one image of an image database containing at least one of a group consisting of color images, gray scale images and sepia-toned images.

7. The method of claim 1, wherein classifying comprises:

performing at least one of retrieving, displaying, tagging, and storing, the image based on the step of classifying.

8. The method of claim 1, wherein the least one of a saturation threshold and an intensity threshold, is determined by:

$$(1-S)^3 + (1-V)^3 \geq c^3$$

wherein c is the threshold, S is the saturation value and V is the intensity value.

9. The method of claim 8, wherein c is about 0.94, S ranges from 0 to 1.0 and V ranges from 0 to 1.0.

10. The method of claim 1, wherein the first color space is RGB and wherein the RGB values of the digital image are normalized to range from 0 to 1.0.

11. The method of claim 10, wherein the conversion from RGB to HSV, is determined by:

$$\text{Max} = \max(R, G, B)$$

$$\text{Min} = \min(R, G, B)$$

-continued $$Val = \text{Max}$$

$$\text{If } (Val = 0) \; Sat = 0, \text{ else } Sat = 1 - \text{Min}/Val$$

$$\text{If } (Sat = 0) \text{ Hue is undefined, else}$$

$$\text{Hue} = \begin{cases} (G-B)/(\text{Max}-\text{Min}) \times 60 & \text{if } (R = \text{Max} \wedge (G-B) \geq 0) \\ (G-B)/(\text{Max}-\text{Min}) \times 60 + 360 & \text{if } (R = \text{Max} \wedge (G-B) < 0) \\ (2.0 + (B-R)/(\text{Max}-\text{Min})) \times 60 & \text{if } (G = \text{Max}) \\ (4.0 + (R-G)/(\text{Max}-\text{Min})) \times 60 & \text{if } (B = \text{Max}) \end{cases}$$

wherein the range of H is 0–360 degrees, S is 0–1.0, and V is 0–1.0.

12. A method of training a system to detect sepia-toned images comprising:

converting values of a first color space of a plurality of training images to HSV values, wherein the training images are sepia-toned images;

removing any pixel of the training images below at least one of a saturation threshold and an intensity threshold for each of the plurality of training images; and estimating, after the step of removing, the color distribution of HSV values for remaining pixels over the plurality of training images.

13. The method of claim 12, further comprising:

establishing a threshold at which an image is classified as a sepia-toned image.

14. The method of claim 12, further comprising:

dividing HSV space uniformly into cells along H, S, and V dimensions;

assigning each of the remaining pixels of the training images to one of the cells based on the HSV values of each remaining pixel;

establishing values for each cell by counting the remaining pixels in each cell; and normalizing the values for each cell by dividing by a total number of the remaining pixels.

15. The method of claim 14, wherein there are thirty six cells in the H dimension, four cells in the S dimension and four cells in the V dimension.

16. The method of claim 12, wherein the least one of a saturation threshold and an intensity threshold, is determined by:

$$(1-S)^3 + (1-V)^3 \geq c^3$$

wherein c is the threshold, S is the saturation value and V is the intensity value.

17. The method of claim 16, wherein c is about 0.94, S ranges from 0 to 1.0 and V ranges from 0 to 1.0.

18. The method of claim 12, wherein the first color space is RGB and wherein the RGB values of each training image are normalized to range from 0 to 1.0.

19. The method of claim 18, wherein the conversion from RGB to HSV, is determined by:

$$\text{Max} = \max(R, G, B)$$

$$\text{Min} = \min(R, G, B)$$

$$Val = \text{Max}$$

$$\text{If } (Val = 0) \; Sat = 0, \text{ else } Sat = 1 - \text{Min}/Val$$

$$\text{If } (Sat = 0) \text{ Hue is undefined, else}$$

$$\text{Hue} = \begin{cases} (G-B)/(\text{Max}-\text{Min}) \times 60 & \text{if } (R = \text{Max} \wedge (G-B) \geq 0) \\ (G-B)/(\text{Max}-\text{Min}) \times 60 + 360 & \text{if } (R = \text{Max} \wedge (G-B) < 0) \\ (2.0 + (B-R)/(\text{Max}-\text{Min})) \times 60 & \text{if } (G = \text{Max}) \\ (4.0 + (R-G)/(\text{Max}-\text{Min})) \times 60 & \text{if } (B = \text{Max}) \end{cases}$$

wherein the range of H is 0–360 degrees, S is 0–1.0, and V is 0–1.0.

20. A computer-based system for classifying digital images comprising:

logic that converts values of a first color space of a digital image to hue saturation intensity (HSV) values;

logic that removes any pixel of the digital image below at least one of a saturation threshold and an intensity threshold;

logic that analyzes, after the step of removing, remaining pixels of the digital image; and logic that analyzes classifies the digital image as a sepia-toned image based on the analysis of the remaining pixels of the digital image.

* * * * *